United States Patent [19]

Braithwaite et al.

[11] 3,981,979

[45] Sept. 21, 1976

[54] PROCESS FOR PRODUCING A PURE HIGH SURFACE AREA ALUMINA

[75] Inventors: David G. Braithwaite, Brookhaven, Miss.; Virgil L. Seale, Houston, Tex.

[73] Assignee: Nalco Chemical Company, Oak Brook, Ill.

[22] Filed: June 6, 1975

[21] Appl. No.: 584,783

Related U.S. Application Data

[63] Continuation-in-part of Ser. No. 400,491, Sept. 24, 1973, abandoned, which is a continuation-in-part of Ser. No. 201,384, Nov. 23, 1971, abandoned.

[52] U.S. Cl. ................................ 423/628; 423/630; 423/631; 252/313 R; 252/317
[51] Int. Cl.² ........................................... C01F 7/02
[58] Field of Search ........... 423/626, 628, 630, 631; 252/313 R, 317

[56] References Cited

UNITED STATES PATENTS

| 1,951,718 | 3/1934 | Ziese et al. ................... 423/630 UX |
| 2,816,079 | 12/1957 | White ............................. 252/313 R |
| 2,859,185 | 11/1958 | Kimberlin et al. .................. 423/628 |
| 3,352,636 | 11/1967 | Wilson et al. ....................... 423/630 |
| 3,367,741 | 2/1968 | Notari et al. ........................ 423/628 |

*Primary Examiner*—Herbert T. Carter
*Attorney, Agent, or Firm*—John G. Premo; Robert A. Miller; Barry W. Sufrin

[57] ABSTRACT

Pure, high surface area alumina is produced by the reaction of aluminum salts with lower aliphatic epoxides in an aqueous media and is washed with aqueous solutions of ammonia which have a pH of at least 7.

2 Claims, No Drawings

PROCESS FOR PRODUCING A PURE HIGH SURFACE AREA ALUMINA

This is a continuation-in-part of our earlier co-pending patent application, Ser. No. 400,491 filed Sept. 24, 1973 and abandoned July 30, 1975, which is a continuation-in-part of our earlier co-pending patent application Ser. No. 201,384, filed Nov. 23, 1971 and abandoned Nov. 29, 1973.

INTRODUCTION

In U.S. Pat. No. 1,951,718, it is shown that aqueous solutions of aluminum salts may be reacted with epoxides to produce alumina. When dilute solutions of, for instance, aluminum chloride are reacted with ethylene oxide, alumina sols result. When more concentrated solutions of aluminum chloride are reacted with ethylene oxide, alumina gels result.

Due to the nature of this reaction, the alumina gels contain organic compounds such as chlorohydrins, glycols and small traces of ethylene oxide. In order to prepare high purity gels, these impurities must be removed from alumina gels produced in accordance with the teachings of U.S. Pat. No. 1,951,718 by such conventional methods as liquid extraction and filtration.

Unfortunately, washing the gels with water or organic solvents followed by filtration is inefficient and somewhat impractical. Repeated water washings result in an agglomerated mass which is difficult to filter. The use of organic solvents is impractical because they are costly and agglomeration remains a problem. Finally, washing and filtration with water or organic solvents does not produce the highest purity alumina gel practically obtainable. A higher purity alumina gel will be produced when alumina produced by the methods described in U.S. Pat. No. 1,951,718 is treated in accordance with the method of our invention.

THE INVENTION

In accordance with this invention, it has been found that when alumina is produced by the reaction of a lower aliphatic epoxide with aluminum salts dissolved in water, the resultant gels produced thereby may be purified and their final properties and characteristics improved by washing such gels immediately after their preparation with an aqueous solution of ammonia which has a pH of at least 7.

PREPARATION OF THE ALUMINA GELS

As indicated, the reaction between aqueous solutions of certain aluminum salts and lower aliphatic epoxides is well known and is discussed in detail in U.S. Pat. No. 1,951,718, the disclosure of which is incorporated herein by reference. The reaction is simple, straightforward and may be conducted at temperatures ranging from room temperature up to about 150°C. When elevated temperatures are used, closed pressurized vessels must be employed in order to contain the reactants and to prevent loss by volatization.

The aluminum salts that may be used to prepare the aluminas may be chosen from such well known compounds as either aluminum chloride or aluminum sulfate. In the practice of the present invention, it is preferred that aluminum chloride be used.

The lower aliphatic epoxides that may be used to prepare the aluminas from the aluminum salt solutions may be selected from such well known epoxides as ethylene oxide, 1,2-propylene oxide, epichlorohydrin, and the like. Any lower epoxide that is capable of entering into the reaction by means of forming a dilute solution during the course of the reaction may be used. Ethylene oxide preferably is used since it is water soluble, as well as inexpensive and commercially available. In preparing the aluminas of this invention, it is desirable that the amount of lower aliphatic epoxide used in relation to the aluminum salt be at least equi-molar and may be in slight excess thereof to insure complete reaction. Generally, epoxides which contain not more than three carbon atoms are most useful.

When relatively concentrated solutions of aluminum chloride are reacted with ethylene oxide, there is formed initially an alumina dispersion which after a short period of time sets up into an agglomerated mass which is dense and difficult to process. This agglomerated mass contains distributed there throughout ethylene chlorohydrin, ethylene glycol, and some traces of ethylene oxide. To produce high purity alumina, it is necessary that these organic contaminants be removed from the alumina gel. While organic solvents have been suggested as a means of removing these contaminants, such a procedure is relatively costly when the alumina is prepared on a large industrial scale. Also, removal of the organic contaminants is not complete.

As the gel densifies after its preparation, washing with organic solvents or water becomes more difficult and hence, less efficient due to the nature of the alumina mass produced. Filtration becomes almost impossible except under high speed centrifigation.

However, we have discovered that, upon the preparation of the alumina by reacting the aluminum salt with the lower aliphatic epoxide, if the alumina is washed immediately after its preparation with a dilute aqueous solution of ammonia which has a pH of at least 7, the resultant material is porous and easy to handle. The aqueous ammonia wash may be readily removed from the gel by filtration. The alumina produced in this way is substantially free from impurity and possesses a high surface area. Purity is significantly better than that obtained using a water wash. The pH of the ammonia solution used to wash the alumina gels formed by the reaction preferably has a pH within the range of 7.5 to 10.5.

EXAMPLES

To illustrate the invention, the following is presented by way of example:

1. 250 grams of aluminum chloride hexahydrate and 1800 grams of water were charged to a 3 liter autoclave. These reagents were heated to 80°C. At this temperature, slow addition of ethylene oxide was begun and exothermic reaction was noted with the temperature reaching a maximum after oxide addition of 92°C. When the addition of 275 grams of ethylene oxide was completed, the temperature was raised to 100°C and held for a period of approximately four hours.

During the course of this reaction, the ethylene oxide is converted to ethylene chlorohydrin, which thus raises the pH to 6.9 to 7. After a pH of 7 was attained, the reaction mass was removed from the autoclave and the pH was further adjusted by the addition of dilute aqueous ammonia to a pH in the range of 8 to 8.5. This rendered the alumina gel filterable. After four washes with water adjusted to pH 8 with dilute ammonium hydroxide, the filter cake was oven dried overnight at 120°C. Characterization of the resulting product showed the material to be highly crystalline with both boehmite and bayerite structure. Surface area of this alumina was 200 square meters per gram. Pore volume of the product was 0.53 milliliters per gram. The chloride content was 0.055 percent.

An analysis of a typical mother liquor (original filtrate) from this process shows the organics present to be distributed among the following products:

| | |
|---|---|
| Ethylene Oxide | 0.65% |
| Ethylene Chlorohydrin | 66.60% |
| Ethylene Glycol | 30.50% |

2. Another alumina sample was prepared substantially as described in Example 1). However, the gel was not pH adjusted, and it was washed four times with water rather than aqueous ammonia as in Example 1). High speed centrifigation was required to complete the water wash. Analysis of the filtrate showed 1.35 percent Cl. This contrasts with the chloride content of 0.055 percent obtained with the ammonia wash of Example 1).

Having thus described our invention, it is claimed as follows:

1. A process for producing a pure, high surface area alumina which comprises reacting in an aqueous media an acidic aluminum salt from the group consisting of aluminum chloride and aluminum sulfate, with a lower aliphatic epoxide from the group consisting of ethylene oxide, 1,2-propylene oxide and epichlorohydrin, to form an alumina gel, washing said gel with an aqueous solution of ammonia which has a pH of at least 7, said gel being characterized as porous and filterable, separating said aqueous solution of ammonia from said gel, and then recovering the purified alumina as a product of the process.

2. The process of claim 1 where the lower aliphatic epoxide is ethylene oxide, the acidic aluminum salt is aluminum chloride and the pH of the ammonia solution is within the range of 7.5 to 10.5.

* * * * *